United States Patent [19]

Inoue et al.

[11] Patent Number: 4,931,485

[45] Date of Patent: Jun. 5, 1990

[54] ORGANOPOLYSILOXANE COMPOSITION

[75] Inventors: Yoshio Inoue, Annaka; Atsushi Yaginuma, Maebashi, both of Japan

[73] Assignee: Shin-Etsu Chemical Co., Ltd., Tokyo, Japan

[21] Appl. No.: 242,615

[22] Filed: Sep. 9, 1988

[30] Foreign Application Priority Data

Sep. 10, 1987 [JP] Japan ................... 62-226931

[51] Int. Cl.$^5$ ............................... C08J 9/00
[52] U.S. Cl. ..................... 521/154; 521/88; 521/94; 521/95; 521/96; 525/478; 528/15; 528/31; 528/32
[58] Field of Search ................ 528/15, 31, 32; 521/154, 88, 94, 95, 96; 525/478

[56] References Cited

U.S. PATENT DOCUMENTS 3,425,967  2/1969  Modic ............................... 528/32
4,418,157  11/1983  Modic .............................. 521/82
4,550,125  10/1985  Lee et al. ......................... 521/117
4,555,529  11/1985  Lee et al. ......................... 521/154
4,608,396  8/1986  Bauman et al. ..................... 521/99
4,631,299  12/1986  Laisney et al. .................... 521/77
4,801,622  1/1989  Inoue et al. ...................... 521/134

Primary Examiner—John C. Bleutge
Assistant Examiner—R. Dean, Jr.
Attorney, Agent, or Firm—Birch, Stewart, Kolasch & Birch

[57] ABSTRACT

Disclosed herein is a foamable organopolysiloxane composition which comprises an organopolysiloxane base polymer containing a vinyl group-containing organopolysiloxane, organohydroxypolysiloxane, and organohydrogenpolysiloxane, and a specific siloxane copolymer containing an alkenyloxysilyl group. The composition readily foams and cures at room temperature to give a silicone rubber foam of high strength, which is useful as a filler and sealant for buildings.

9 Claims, No Drawings

ORGANOPOLYSILOXANE COMPOSITION

BACKGROUND OF THE INVENTION

1. Field of the Invention

The present invention relates to a foamable organopolysiloxane composition used to produce a silicone rubber foam suitable for fillers, sealants, and the like.

2. Description of the Prior Art

Heretofore, there have been proposed several organopolysiloxane compositions which foam at room temperature or upon slight heating. Such compositions are produced from an organosiloxane having a hydrogen atom connected directly to a silicon atom (or ≡SiH bond) and an organosilane having a hydroxyl group connected to a silicon atom, by dehydrogenation reaction in the presence of a dehydrogenation catalyst such as quaternary ammonium salt, heavy metal carboxylate, and alkali metal alkoxide (as disclosed in Japanese Patent Publication Nos. 9297/1958 and 8755/1969) or by the aid of a platinum compound (as disclosed in Japanese Patent Publication Nos. 12675/1970, 42827/1977, and 23462/1981, and Japanese Patent Application Laid-open No. 169330/1984).

Unfortunately, the silicone rubber foams produced by these conventional processes are not necessarily suitable for building sealants and fillers because of low strength. Therefore, there has been a demand for the development of a new silicone rubber foam having high strength and suitable for building sealants, fillers, and the like.

SUMMARY OF THE INVENTION

The present invention was made under the above-mentioned circumstances. It is an object of the present invention to provide a foamable organopolysiloxane composition which, upon foaming and curing, gives a silicone rubber foam which has high strength and also has the properties of both rubber and foam.

The present inventors carried out a series of researches in order to achieve the above-mentioned object. As the result, it was found that a silicone rubber foam having high strength can be produced from a foamable silicone composition incorporated with a specific siloxane copolymer. The silicone compositions are composed mainly of an organopolysiloxane base polymer containing a vinyl group-containing organopolysiloxane, organohydroxypolysiloxane, and organohydorogenpolysiloxane. The specific siloxane copolymer is either a copolymer (I) composed of:

(A)

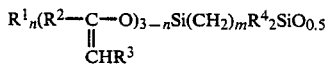

unit, (B) $R^5{}_3SiO_{0.5}$ unit, and (C) $SiO_2$ unit (where $R^1$, $R^2$, $R^4$, and $R^5$ each denotes a monovalent hydrocarbon group excluding aliphatic unsaturated hydrocarbon groups; $R^3$ denotes a hydrogen atom or monovalent hydrocarbon group excluding aliphatic unsaturated hydrocarbon groups; n denotes an integer of 0, 1, or 2; and m denotes an integer of 2 to 6).

or copolymer (II) composed of unit (A), unit (B), unit (C), and (D) $R^6{}_2SiO$ unit, (where $R^6$ denotes a monovalent hydrocarbon group excluding aliphatic unsaturated hydrocarbon groups).

The siloxane copolymer having an alkenyloxysilyl group causes the crosslinking for rubber curing and the foaming by hydrogenation to proceed simultaneously in the reaction system, yielding a silicone rubber foam having high strength. These findings led to the present invention.

DETAILED DESCRIPTION OF THE INVENTION

The foamable organopolysiloxane composition according to the present invention is composed mainly of an organopolysiloxane base polymer containing a vinyl group-containing organopolysiloxane, organohydroxypolysiloxane and organohydrogenpolysiloxane.

The vinyl group-containing organopolysiloxane is not specifically limited; but one which is represented by following formula (1) is preferable.

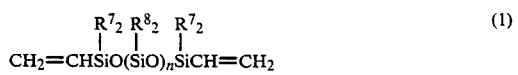

where $R^7$ and $R^8$ denote the same or different unsubstituted or substituted monovalent hydrocarbon groups having 1 to 8 carbon atoms, preferably 1 to 6 carbon atoms (excluding aliphatic unsaturated hydrocarbon groups) selected from alkyl groups (such as methyl group, ethyl group, propyl group, and butyl group), cycloalkyl groups (such as cyclohexyl group), aryl groups (such as phenyl group and tolyl group), and said groups with a part or all of the hydrogen atoms attached to the carbon atom of the group replaced by halogen atoms or cyano groups (such as a chloromethyl group, a trifluoropropyl group, and a cyanoethyl group, respectively); and n denotes a number of 50 to 2000. It should have a viscosity of 20 to 10,000,000 cSt, preferably 100 to 1,000,000 cSt, at 25° C.

Examples of the vinyl group-containing organopolysiloxane include the following.

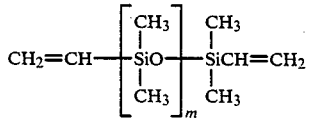

(where m is a number of 50 to 2000.)

Examples of the organohydroxypolysiloxane include one which contains at least three units represented by formula (2) below in one molecule but contains no aliphatic unsaturated hydrocarbon groups.

where $R^9$ denotes a substituted or unsubstituted monovalent hydrocarbon group having 1 to 8 carbon atoms, preferably 1 to 6 carbon atoms, excluding aliphatic unsaturated hydrocarbon groups, which is the same as or different from the above-mentioned $R^7$ and $R^8$; a denotes 0, 1 or 2: b denotes 1, 2, or 3; and a+b denotes 1, 2 or 3. This organohydroxypolysiloxane may be linear, branched, or cyclic; but it should preferably be one which has a viscosity of 10 to 10,000 cSt at 25° C.

The organohydroxypolysiloxane having at least three units represented by formula (2) in one molecule can be easily obtained from an organohydrogenpolysiloxane having at least three units represented by the formula below

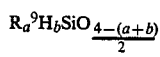

(where $R^9$, a, and b are defined as above.)
and water by dehydrogenation in an organic solvent such as acetone, 1,4-dioxane, and tetrahydrofuran, in the presence of a catalytic amount of a platinum compound.

Examples of the organohydroxypolysiloxane containing at least three units represented by formula (2) include the following:

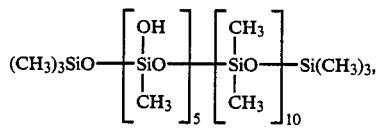

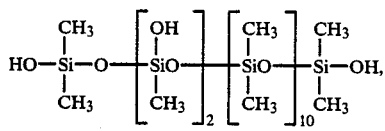

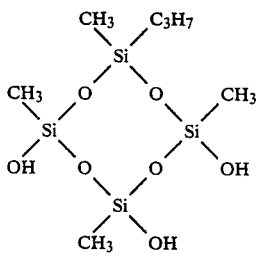

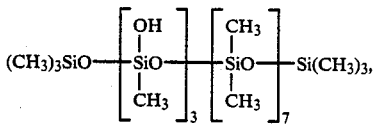

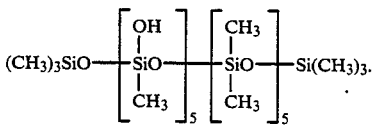

The organohydrogenpolysiloxane should preferably be one which contains at least two units represented by formula (3) below in one molecule but contains no aliphatic unsaturated hydrocarbon groups.

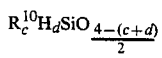

(where $R^{10}$ denotes a unsubstituted or substituted monovalent hydrocarbon group having 1 to 8 carbon atoms, preferably 1 to 6 carbon atoms, excluding aliphatic unsaturated hydrocarbon groups, which is the same as or different from the above-mentioned $R^7$ and $R^8$; c denotes 0, 1 or 2; d denotes 1, 2, or 3; and c+d denotes 1, 2, or 3.

This organohydrogenpolysiloxane may be linear, branched, or cyclic; but it should preferably be one which has a viscosity of 1 to 100,000 cSt at 25° C.

Examples of the organohydrogenpolysiloxane containing at least two units represented by formula (3) in one molecule include the following:

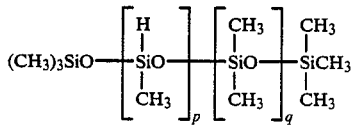

where p=2 to 500, and q=0 to 500.

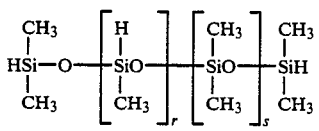

where r=0 to 500, and s=0 to 500.

The siloxane copolymer constituting the organopolysiloxane compositions of the present invention is a siloxane copolymer selected from copolymer (I) and copolymer (II) as mentioned above. Copolymer (I) is composed of (A)

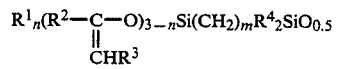

unit,
(B) $R^5{}_3SiO_{0.5}$ unit, and
(C) $SiO_2$ unit
(where $R^1$, $R^2$, $R^4$, and $R^5$ each denotes a monovalent hydrocarbon group excluding aliphatic unsaturated hydrocarbon groups, $R^3$ denotes a hydrogen atom or monovalent hydrocarbon group excluding aliphatic unsaturated hydrocarbon group; n denotes an integer of 0, 1, or 2; and m denotes an integer of 2 to 6.

Copolymer (II) is composed of unit (A), unit (B), unit (C), and
(D) $R^6{}_2SiO$ unit
(where $R^6$ denotes a monovalent hydrocarbon group excluding aliphatic unsaturated hydrocarbon groups.)

The monovalent hydrocarbon groups of $R^1$ to $R^6$ have 1 to 8 carbon atoms, preferably 1 to 6 carbon atoms and include alkyl groups (such as methyl group, ethyl group, propyl group, and butyl group), cycloalkyl groups (such as cyclohexyl group), aryl groups (such as phenyl group and tolyl group), and said groups with a part or all of the hydrogen atoms attached to the carbon atom of the group replaced by halogen atoms or cyano groups (such as a chloromethyl group, a trifluoropropyl group, and a cyanoethyl group, respectively), respectively.

Siloxane copolymer (I) should preferably contain monofunctional units and tetrafunctional units in a molar ratio of 0.01 to 2:1 and also contain unit (A) and unit (B) in a molar ratio of 0.01 to 1:1. Siloxane copolymer (II) should preferably contain monofunctinal units and tetrafunctional units in a molar ratio of 0.01 to 2:1, difunctional units and tetrafunctional units in a molar ratio of 2 or less: 1, and unit (A) and unit (B) in a molar ratio of 0.01 to 1:1.

This siloxane copolymer can be easily obtained by the addition reaction of a copolymer composed of:
(A') $CH_2=CH(CH_2)_{m-2}R^4{}_2{}_2SiO_{0.5}$ unit,
(B) $R^5{}_3SiO_{0.5}$ unit, and
(C) $SiO_2$ unit
 (where $R^4$, $R^5$, and m are defined as above) or a copolymer composed of said unit (A'), unit (B), unit (C), and
(D) $R^6{}_2SiO$ unit,
 (where $R^6$ is defined as above)
and an organosiloxane represented by $$R^1{}_n(R^2-\underset{\underset{CHR^3}{\|}}{C}-O)_{3-n}SiH$$

(where $R^1$, $R^2$, $R^3$, and n are defined as above)
in an organic solvent such as toluene and xylene in the presence of a platinum catalyst.

Examples of this siloxane copolymer include the following:

$$[(CH_3)_3SiO_{0.5}]_6[(CH_3CO)_2(CH_3)Si(CH_2)_2Si(CH_3)_2O_{0.5}][SiO_2]_8,$$
$$\overset{\|}{CH_2}$$

$$[(CH_3)_3SiO_{0.5}]_3[(CH_3CO)_2(CH_3)Si(CH_2)_2Si(CH_3)_2O_{0.5}][SiO_2]_4,$$
$$\overset{\|}{CH_2}$$

$$[(CH_3)_3SiO_{0.5}]_6[(CH_3CO)_3Si(CH_2)_3Si(CH_3)_2O_{0.5}][SiO_2]_8 \text{ and}$$
$$\overset{\|}{CH_2}$$

$$[(CH_3)_3SiO_{0.5}]_9[(CH_3CO)_2(CH_3)Si(CH_2)_2Si(CH_3)_2O_{0.5}][SiO_2]_9[(CH_3)_2SiO]_2$$
$$\overset{\|}{CH_2}$$

The compounding ratio for the individual components is as follows: The amount of the vinyl group-containing organopolysiloxane which is the major component of the composition of the present invention should preferably be 100 to 50 parts by weight. However, it may be reduced to about 30 parts by weight in proportion to the amount of the other components.

The amount of the organohydroxypolysiloxane should be such that the number of moles of silanol groups in the organohydroxypolysiloxane is 0.1 to 10 times the total number of moles of alkenyl groups in the siloxane copolymer and vinyl groups in the vinyl group-containing organopolysiloxane. With lower than 0.1 times, the resulting composition is poor in foaming performance on account of insufficient gas generation by the dehydrogenation reaction of the organohydrogenpolysiloxane with silanol groups. With higher than 10 times, the resulting silicone rubber foam has a low hardness and hence poor physical properties. The preferred amount of the organohydroxypolysiloxane is 1 to 100 parts by weight, particularly 5 to 20 parts by weight, for 100 to 50 parts by weight of the vinyl group-containing organopolysiloxane in the case where a vinyl group-containing organopolysiloxane represented by the above-mentioned formula (1) is used and an organohydrogenpolysiloxane represented by the above-mentioned formula (3) is used.

The amount of the organohydrogenpolysiloxane should preferably be such that the number of moles of ≡SiH bonds in the organohydrogenpolysiloxane is 0.6 to 40 times the total number of moles of vinyl groups in the vinyl group-containing organopolysiloxane, alkenyl groups in the siloxane copolymer, and silanol groups in the organohydroxypolysiloxane. With lower than 0.6 times, the resulting composition is poor in foaming performance on account of insufficient gas generation by the dehydrogenation reaction of the organohydrogenpolysiloxane with organohydroxypolysiloxane. With higher than 40 times, the resulting silicone rubber foam has a low hardness and hence poor physical properties. The preferred amount of the organohydrogenpolysiloxane is 1 to 100 parts by weight, particularly 5 to 30 parts by weight, for 100 to 50 parts by weight of the vinyl group-containing organopolysiloxane in the case where a vinyl group-containing organopolysiloxane represented by the above-mentioned formula (1) is used and an organohydroxypolysiloxane represented by the above-mentioned formula (2) is used.

The amount of the siloxane copolymer should be an effective amount for imparting high strength to the composition. The preferred amount of the siloxane copolymer should be such that the number of moles of vinyl groups in the vinyl group-containing organopolysiloxane is more than 10 times that of alkenyl bonds in the copolymer. With lower than 10 times, the effect of the siloxane copolymer would be limited. The preferred amount of the siloxane copolymer is 1 to 100 parts by weight, particularly 20 to 50 parts by weight, for 100 to 50 parts by weight of the vinyl group-containing organopolysiloxane in the case where a vinyl group-containing organopolysiloxane represented by the above-mentioned formula (1) is used.

According to the present invention, the organopolysiloxane composition should preferably be incorporated with a catalyst component such as platinum metals, platinum metal compounds, and complexes thereof. Examples of the catalyst component include chloroplatinic acid, platinum-olefin complex, platinum-vinyl silane complex, platinum-siloxane complex, platinum phosphite, and platinum-phosphine complex.

This catalyst component catalyzes the addition reaction of vinyl groups in the vinyl group-containing organopolysiloxane, alkenyl groups in the siloxane copolymer, and ≡SiH bonds in the organohydrogenpolysiloxane. It also catalyzes the condensation reaction of silanol groups in the organohydroxypolysiloxane and ≡SiH bonds in the organohydrogenpolysiloxane. The preferred amount of the catalyst should be 1 to 200 ppm, particularly 5 to 50 ppm (in terms of metallic platinum), for the total weight of the vinyl group-containing organopolysiloxane, organohydroxypolysiloxane, organohydrogenpolysiloxane, and siloxane copolymer.

The organopolysiloxane composition of the present invention can be prepared by uniformly mixing the above-mentioned vinyl group-contianing organopolysiloxane, organohydroxypolysiloxane, organohydrogenpolysiloxane, siloxane copolymer, and platinum catalyst (optionally added) in prescribed amounts. The composition may also be incorporated with 0 to 100 parts, preferably 1 to 100 parts by weight of inorganic filler such as silica fine powder, calcium carbonate, calcium silicate, titanium dioxide, ferric oxide, zinc oxide, and carbon black to improve the mechanical properties of the silicone rubber foam obtained by foaming and curing the composition of the invention. The composition may further be incorporated with an effective amount of an organic blowing agent such as azobisisobutyronitrile and N,N'-dimethyl-N,N'-dinitroterephthalamide and a low-boiling compound such as methanol, cyclohexane, and freon to promote the foaming, and also an effective amount of a surface active agent to lower the surface tension of the system. The composition may additionally be incorporated with a pigment, dye, heat resistance improver, flame retardance improver, and silane coupling agent as an adhesion promoter.

The organopolysiloixane composition of the present invention becomes a silicone rubber foam upon foaming and curing. The foaming and curing takes place when the composition is allowed to stand at normal temperature. The foaming and curing may be accelerated by heating the composition to 30° to 70° C.

According to the present invention, an organopolysiloxane composition can be foamed and cured to give a silicone rubber foam having a high expansion ratio and high strength. The silicone rubber foam will find use as a filler and sealant for buildings.

The invention will be described in more detail with reference to the following examples, which are not intended to restrict the scope of the invention.

REFERENTIAL EXAMPLE 1

The referential example illustrates the syntheses of polyhydroxymethylpolysiloxane and siloxane copolymer. The amounts are expressed in parts by weight, and the viscosity is indicated by the value measured at 25° C.

In 2674 g of tetrahydrofuran was dissolved 598 g of methylhydrogenpolysiloxane represented by the average formula below:

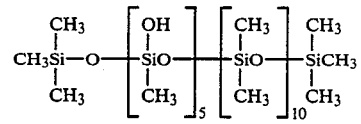

To the solution was added 9.7 g of 1% solution of chloroplatinic acid in isopropyl alcohol, followed by heating to 50° to 60° C. To the heated solution was added dropwise 49.7 g of water. The solution was kept at 50° to 60° C. for 3 hours. To the solution were further added 30 g of activated carbon and 250 g of anhydrous sodium sulfate, followed by stirring for 2 hours. After filtration, tetrahydrofuran was distilled away at 40° C. and 30 mmHg. Thus there was obtained 507 g of polyhydroxymethylpolysiloxane represented by the formula below:

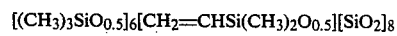

which has a viscosity of 63 cSt, a specific gravity of 1.08, and refractive index of 1.410, and contains 0.40 mol/100 g of hydroxyl (SiOH) unit.

REFERENTIAL EXAMPLE 2

To 1000 g of 50% solution in xylene of methylvinylpolysiloxane represented by the average formula below:

$[(CH_3)_3SiO_{0.5}]_6[CH_2=CHSi(CH_3)_2O_{0.5}][SiO_2]_8$ was added 0.5 g of 1% solution of chloroplatinic acid in isopropyl alcohol, followed by heating to 50° to 60° C. To the heated solution was added dropwise 81.7 g of methyldiisopropenoxysilane. The solution was kept at 80° to 100° C. for 5 hours. To the solution was further added 10 g of activated carbon, followed by stirring for 2 hours. Upon filtration, there was obtained 1027 g of 50% solution in xylene of siloxane copolymer represented by the formula below:

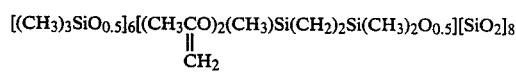

which was a viscosity of 5 cSt, a specific gravity of 1.00, and a refractive index of 1.463, and contains 0.083 mol/100 g of isopropenoxy group represented by the formula below:

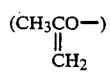

To be used as a component of the organopolysiloxane composition of the present invention, this copolymer should be mixed with a proper amount of vinyl group-containing organopolysiloxane and the resulting mixture is free of xylene at 120° C. and 10 mmHg. The thus obtained mixture of a vinyl group-containing organopolysiloxane and a siloxane copolymer can be used.

EXAMPLES 1 to 6

Six types of organopolysiloxane compositions were prepared by uniform mixing from 100 g of α, ω-divinyldimethylpolysiloxane (having a viscosity of 100,00 cSt) represented by the average formula below:

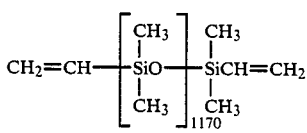

the polyhydroxymethylpolysiloxane obtained in Referential Example 1, the siloxane copolymer obtained in Referential Example 2, methylhydrogenpolysiloxane represented by the formula below:

$$CH_3-\underset{\underset{CH_3}{|}}{\overset{\overset{CH_3}{|}}{Si}}O-\left[\underset{\underset{CH_3}{|}}{\overset{\overset{H}{|}}{Si}}O\right]_{38}-\underset{\underset{CH_3}{|}}{\overset{\overset{CH_3}{|}}{Si}}-CH_3$$

1% solution of chloroplatinic acid in isopropyl alcohol (2 wt % in terms of platinum), and silica fine powder according to the formulation shown in Table 1.

These compositions were allowed to stand in an atmosphere at 20° C. and 55% RH for 1 hour. They foamed and cured into silicone rubber foams. The silicone rubber foams were examined for expansion ration and physical properties (hardness, elongation and tensile strength) according to Japanese Industrial Standard K-6301 in the sheet form. The results are shown in Table 1.

TABLE 1

| Example No. | 1 | 2 | 3 | 4 | 5 | 6 |
|---|---|---|---|---|---|---|
| Composition (%) | | | | | | |
| Siloxane copolymer | 33 | 33 | 33 | 33 | 33 | 33 |
| α, ω-divinyldimethylpolysiloxane | 100 | 100 | 100 | 100 | 100 | 100 |
| Polyhydroxymethylpolysiloxane | 12 | 12 | 15 | 15 | 18 | 18 |
| Methylhydrogenpolysiloxane | 17 | 20 | 20 | 24 | 24 | 28 |
| 1% solution of chloroplatinic acid | 0.8 | 0.8 | 0.8 | 0.8 | 0.8 | 0.8 |
| Silica fine powder | 13 | 13 | 13 | 13 | 13 | 13 |
| Expansion ratio | 3.0 | 3.2 | 3.4 | 3.5 | 3.8 | 3.9 |
| Physical properties | | | | | | |
| Hardness (Ascar C) | 20 | 20 | 18 | 17 | 16 | 14 |
| Elongation (%) | 150 | 160 | 150 | 170 | 170 | 170 |
| Tensile strength(kgf/cm$^2$) | 5.2 | 5.2 | 5.0 | 4.8 | 4.9 | 4.6 |

COMPARATIVE EXAMPLE

An organopolysiloxane composition was prepared by uniform mixing from 100 parts by weight of 60 , ω-divinyldimethylpolysiloxane (having a viscosity of 100,000 cSt) represented by the average formula below:

$$CH_2=CH-\underset{\underset{CH_3}{|}}{\overset{\overset{CH_3}{|}}{Si}}O-\left[\underset{\underset{CH_3}{|}}{\overset{\overset{CH_3}{|}}{Si}}\right]_{1170}CH=CH_2$$

33 parts by weight of a siloxane copolymer represented by the average formula below:

[(CH$_3$)$_3$SiO$_{0.5}$]$_6$[CH$_2$=CHSi(CH$_3$)$_2$O$_{0.5}$][SiO$_2$]$_8$ 15 parts by weight of the polyhydroxymethylpolysiloxane obtained in Referential Example 1, 20 parts by weight of methylhydrogenpolysiloxane represented by the formula below:
0.8 parts by weight of 1% solution of chloroplatinic acid in isopropyl alcohol, and 13 parts by weight of silica fine powder.

The composition was allowed to stand in an atmosphere at 20° C. and 55% RH for 1 hour. It foamed and cured into a silicone rubber foam. The silicone rubber foam was examined for physical properties. The results are shown in Table 2 together with the data of the foam obtained in Example 3.

TABLE 2

| Examples | Comparative Example | Example 3 |
|---|---|---|
| Expansion ratio | 1.7 | 3.4 |
| Physical properties of sheet | | |
| Hardness (Ascar C) | 6 | 18 |
| Elongation (%) | 90 | 150 |
| Tensile strength (kgf/cm$^2$) | 1.6 | 5.0 |

It is noted from Table 2 that the organopolysiloxane composition of the present invention provides, upon foaming and curing, a silicone rubber foam which has a high expansion ration and high strength.

What is claimed is:

1. A foamable organopolysiloxane composition which comprises an organopolysiloxane base polymer containing a vinyl group-containing organopolysiloxane, an organohydroxypolysiloxane and an organohydrogenpolysiloxane; and a siloxane copolymer selected from copolymer (I) composed of:
   (A)

$$R^1{}_n(R^2-\underset{\underset{CHR^3}{\|}}{C}-O)_{3-n}Si(CH_2)_mR^4{}_2SiO_{0.5}$$

unit,
   (B) R$^5{}_3$SiO$_{0.5}$ unit and
   (C) SiO$_2$ unit
      where R$^1$, R$^2$, R$^4$, and R$^5$ each denotes a monovalent hydrocarbon group excluding aliphatic unsaturated hydrocarbon groups; R$^3$ denotes a hydrogen atom or monovalent hydrocarbon group excluding aliphatic unsaturated hydrocarbon group; n denotes an integer of 0, 1 or 2; and m denotes an integer of 2 to 6
   or copolymer (II) composed of unit (A), unit (B), unit (C) and
   (D) R$^6{}_2$SiO unit,
      where R$^6$ denotes a monovalent hydrocarbon group excluding aliphatic unsaturated hydrocarbon groups,
      where R$^6$ denotes a monovalent hydrocarbon group excluding aliphatic unsaturated hydrocarbon groups,
      wherein unit (A), unit (B) and unit (C) are defined as above.

2. The composition as claimed in claim 1, wherein the siloxane copolymer (I) is one which contains monofunctional units and tetrafunctional units in a molar ratio of monofunctional units based on tetrafunctional units of 0.01 to 2:1 and unit (A) and unit (B) in a molar ratio of unit (A) based on unit (B) of 0.01 to 1:1.

3. The composition as claimed in claim 1, wherein the siloxane copolymer (II) contains monofunctional units and tetrafunctional units in a molar ratio of monofunctional units based on tetrafunctional units of 0.01 to 2:1, difunctional units and tetrafunctional units in a molar ratio of difunctional units based on tetrafunctional units of 2 or less: 1 and unit (A) and unit (B) in a molar ratio of unit (A) based on unit (B) of 0.01 to 1:1.

4. The composition as claimed in claim 1, wherein the siloxane copolymer is one which is composed of $$CH_3(CH_3-\underset{\underset{CH_2}{\|}}{C}-O)_2Si(CH_2)_2(CH_3)_2SiO_{0.5} \text{ unit,}$$

$(CH_3)_3SiO_{0.5}$ unit and $SiO_2$ unit.

5. The composition as claimed in claim 1, wherein the vinyl group-containing organopolysiloxane is one which is represented by formula (1) below:

$$CH_2=CHSiO(SiO)_n SiCH=CH_2 \quad \underset{R^7_2}{|} \underset{R^8_2}{|} \underset{R^7_2}{|} \qquad (1)$$

where $R^7$ and $R^8$ each denotes a monovalent hydrocarbon group excluding aliphatic unsaturated hydrocarbon groups, and n denotes a number of 50 to 2000 and has a viscosity of 10,000,000 cSt at 25° C.

6. The composition as claimed in claim 1, wherein the organohydroxypolysiloxane is one which contains at least three units represented by formula (2) below in one molecule, $$R^9{}_a(OH)_b SiO_{\frac{4-(a+b)}{2}} \qquad (2)$$

where $R^9$ denotes a monovalent hydrocarbon group excluding aliphatic unsaturated hydrocarbon groups; and a denotes 0, 1, or 2; b denotes 1, 2, or 3; and a+b denotes 1, 2, or 3, contains no aliphatic unsaturated hydrocarbon groups in the molecule and has a viscosity of 10 to 10,000 cSt at 25° C.

7. The composition as claimed in claim 1, wherein the organohydrogenpolysiloxane is one which contains at least two units represented by formula (3) below in one molecule, $$R^{10}{}_c H_d SiO_{\frac{4-(c+d)}{2}} \qquad (3)$$

where $R^{10}$ denotes a monovalent hydrocarbon group excluding aliphatic unsaturated hydrocarbon groups, c denotes 0, 1, or 2; d denotes 1, 2, or 3; and c+d denotes 1, 2, or 3, contains no aliphatic unsaturated hydrocarbon groups in the molecule, and has a viscosity of 1 to 100,000 cSt at 25° C.

8. The composition as claimed in claim 1, which further comprises a catalyst component selected from the group consisting of a platinum metal, platinum metal compounds and complexes thereof.

9. The composition as claimed in claim 1, which further comprises a catalyst component selected from the group consisting of chloroplatinic acid, platinum-olefin complex, Platinum-vinyl silane complex, platinumsiloxane complex, platinum phosphite and platinum-phosphine complex.

* * * * *